United States Patent [19]

Rosser

[11] 3,753,052

[45] Aug. 14, 1973

[54] RECTIFIER BRIDGE ASSEMBLY COMPRISING STACK OF HIGH-CURRENT PN SEMICONDUCTOR WAFERS IN A SEALED HOUSING WHOSE END CAPS COMPRISE AC TERMINALS OF THE BRIDGE

[75] Inventor: Daniel B. Rosser, Springfield, Pa.

[73] Assignee: General Electric Company, Philadelphia, Pa.

[22] Filed: Mar. 1, 1972

[21] Appl. No.: 230,586

[52] U.S. Cl. ..... 317/234 R, 317/234 A, 317/234 P, 317/234 W, 29/589

[51] Int. Cl. .......................... H01l 3/00, H01l 5/00

[58] Field of Search .................... 317/234, 6, 11, 1; 29/589

[56] References Cited

UNITED STATES PATENTS

| | | | |
|---|---|---|---|
| 3,249,827 | 5/1966 | Benda et al. | 317/234 |
| 3,484,864 | 12/1969 | Bernstein et al. | 317/234 |
| 3,619,473 | 11/1971 | Meyerhoff et al. | 317/234 |
| 3,651,383 | 3/1972 | Livezey et al. | 317/234 |

FOREIGN PATENTS OR APPLICATIONS

| | | | |
|---|---|---|---|
| 1,086,329 | 10/1967 | Great Britain | 317/234 W |
| 140,130 | 1/1935 | Germany | 317/234 W |

*Primary Examiner*—John W. Huckert
*Assistant Examiner*—Andrew J. James
*Attorney*—J. Wesley Haubner et al.

[57] ABSTRACT

An integrally housed bridge circuit including a plurality of high power semiconductor rectifiers. The rectifiers are disposed within a hermetically sealed insulative housing and are electrically interconnected therein to form a bridge circuit having a pair of A-C terminals and a pair of D-C terminals.

7 Claims, 4 Drawing Figures

RECTIFIER BRIDGE ASSEMBLY COMPRISING STACK OF HIGH-CURRENT PN SEMICONDUCTOR WAFERS IN A SEALED HOUSING WHOSE END CAPS COMPRISE AC TERMINALS OF THE BRIDGE

BACKGROUND AND OBJECTS OF THE INVENTION

This invention relates to rectifier assemblies and more particularly to an integrally housed assembly of plural rectifying elements of the semiconductor type. The following published art now known to applicant is exemplary of prior art approaches relevant in this area of technology: U.S. Pat. No. 1,872,304 (Kraut et al.); U.S. Pat. No. 2,468,051 (Escoffery); U.S. Pat. No. 2,781,480 (Mueller); U.S. Pat. No. 2,788,474 (Jackson); U.S. Pat. No. 3,274,457 (Wislocky); U.S. Pat. No. 3,280,389 (Martin); U.S. Pat. No. 3,319,136 (Perry et al.); U.S. Pat. No. 3,400,312 (Dornfeld et al.); U.S. Pat. No. 3,443,168 (Camp et al.); U.S. Pat. No. 3,463,970 (Gutzwiller); U.S. Pat. No. 3,471,757 (Sias); U.S. Pat. No. 3,506,889 (Vogt); and U.S. Pat. No. 3,532,942 (Boyer).

High-current solid-state rectifiers made of semiconductor material are well known in the electrical art. Typical devices of this kind comprise a broad area multilayer semiconductor wafer sealed within a tubular insulating housing. The housing is capped at each end by a flat metal electrode which abuts the interposed wafer. A clamping structure is utilized to apply pressure to the flat metal electrodes to insure that good electrical contact is made between the abutting parts. The rectifier and its associated clamping structure form what may be denoted as a rectifier assembly.

In practical electrical apparatus plural rectifier assemblies are often interconnected to form bridge circuits. Even if the separate rectifiers of a bridge share a common clamping structure (see Sias, supra), the arrangement may be too space consuming or too expensive for use in certain apparatus. Relatively simple integrally housed bridge rectifier assemblies have heretofore been proposed (see Escoffery, Jackson, Wislocky, and Gutzwiller, supra), but such assemblies may not have very high current capabilities, particularly under transient or fault conditions.

Accordingly, it is a general object of my invention to provide an integrally housed semiconductor-composed bridge circuit which is capable of safely tolerating high levels of current.

It is a further object of my invention to provide a small and simple integrally housed rectifier bridge circuit composed of high current capability semiconductor rectifier elements.

In copending application Ser. No. 184,354 which was filed on Sept. 28, 1971, for W. C. Kotheimer and is assigned to the same assignee as my invention, there is disclosed and claimed a system for monitoring the continuity of a ground conductor which is used to ground electric mobile mining equipment. That system includes a receiver connected in the ground conductor at a remote location and adapted for monitoring the presence of a low level current which is introduced into the ground conductor at the site of the mining equipment. The receiver includes a rectifying bridge circuit whose D-C terminals are clamped by a forward poled rectifying element and across which terminals there is provided the coil of a current monitoring relay. Since the receiver is connected in the ground conductor through which high currents will flow in the event of a phase-to-ground short circuit in the mining equipment, it is necessary that the receiver be capable of withstanding such currents or if incapable of withstanding them, to fail in a shorted condition.

It is accordingly a further object of my invention to provide an integrally housed rectifying bridge circuit which is particular'y adapted for use in a receiver like that disclosed in the above-noted copending application.

SUMMARY OF THE INVENTION

In accordance with one aspect of my invention I provide an integrally housed bridge circuit. The circuit includes plural rectifying elements which are disposed within a tubular insulative housing along the axis thereof. The housing is capped at each end by a pair of electrically conductive capping members and includes a pair of conductive members passing through its walls. Electrically conductive connectors are provided inside the housing to interconnect the elements. The connectors include flat portions which are disposed between and which abut selected rectifying elements, so that upon the application of pressure to said elements and the abutting portions a bridge circuit, having a pair of A-C terminals and a pair of D-C terminals, results. The D-C terminals are connected to the conductive members and the A-C terminals are connected to the capping members.

BRIEF DESCRIPTION OF THE DRAWINGS

The subject matter of my invention is particularly pointed out and distinctly claimed in the concluding portion of the specification. For a more complete understanding of the invention reference should be made to the following description taken in conjunction with the accompanying drawings in which:

DETAILED DESCRIPTION OF THE PREFERRED EMBODIMENT

Figure 1:
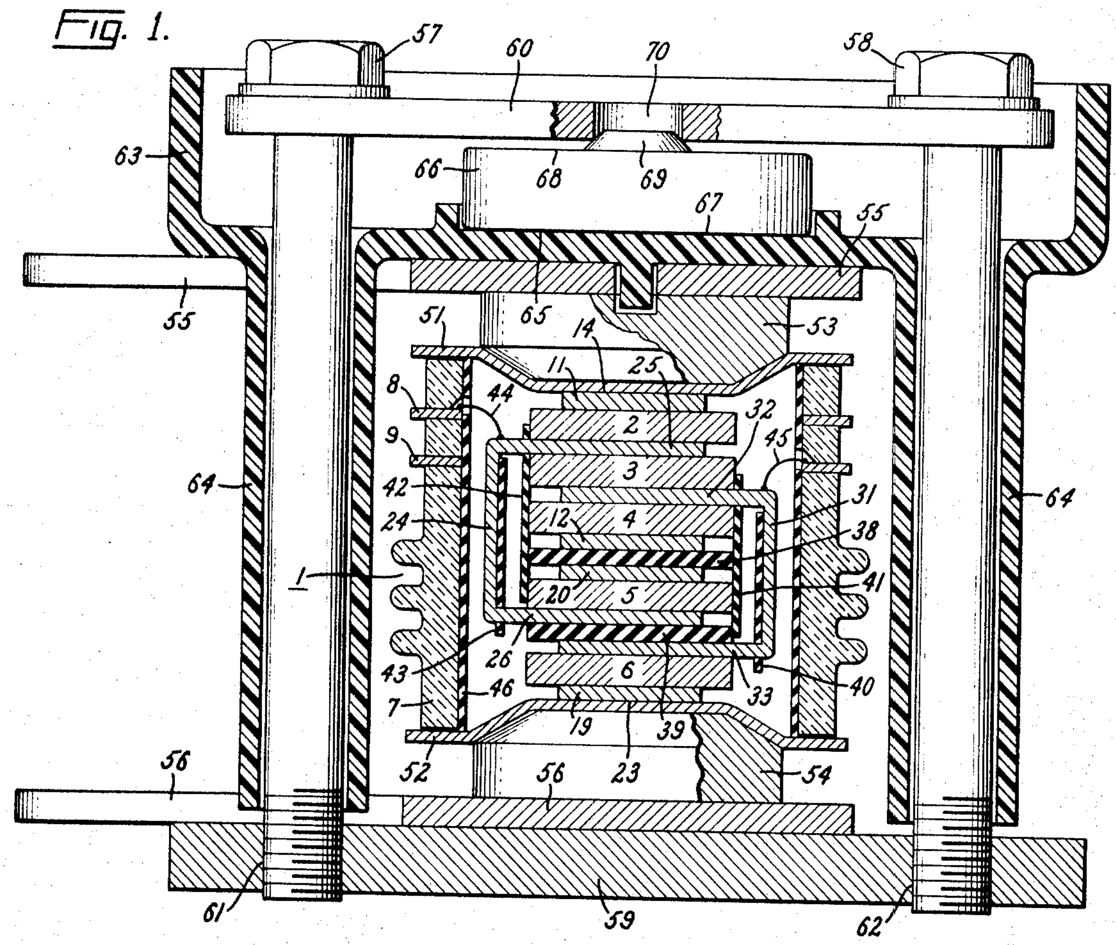
FIG. 1 is a view partially in cross-section of an integrally housed bridge circuit mounted in a pressure applying assembly.

FIG. 1 is a side view, partially in section, of an integral bridge rectifier assembly in accordance with my invention. The assembly comprises a hermetically sealed housing in which a plurality of rectifying elements are disposed and interconnected to form a rectifying bridge and associated clamping structure. The combination of the sealed housing and the interconnected rectifying elements therein will be hereinafter referred to as the integrally housed bridge device 1.

As can be seen the device comprises five rectifying elements 2, 3, 4, 5, and 6, each of which is composed of a disk-like wafer of semiconductor material, e.g., silicon, having a plurality of layers (not shown) forming at least one rectifying (PN) junction. Each wafer includes two parallel flat sides, one side of which forming the elements' anode and the other side forming its cathode. The anode side of the element is denoted in FIG. 2 by the letter A and the cathode side of the element is denoted by the letter K.

The elements are disposed inside the hollow interior of a tubular insulative housing 7 and are stacked along the axis of the housing with their sides parallel to one another. The housing is formed of a ceramic material. A pair of ring-like conductive members 8 and 9 are disposed within the wall of the housing and serve to communicate with both the interior and the exterior thereof.

Figure 4:
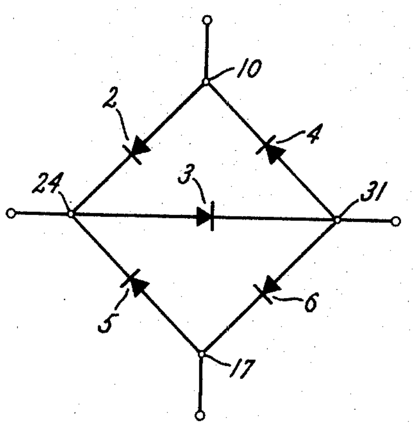
FIG. 4 is a schematic circuit diagram of the bridge circuit shown in FIG. 1.

The rectifying elements are electrically interconnected to form a rectifying bridge (see FIG. 4) having a pair of A-C terminals and a pair of D-C terminals. To that end, electrically conductive interconnecting members or conductors are provided. The rectifying elements and the interconnecting conductors will be generically referred to hereinafter as the bridge components.

Each of the interconnecting conductors is "U-shaped" and includes a pair of legs or sides. Each of the legs in turn includes plural flat portions which are adapted for abutting the rectifying elements to effectuate the electrical bridge interconnection. The shape of the interconnecting conductors can best be seen in the exploded view shown in FIG. 2.

Figure 2:
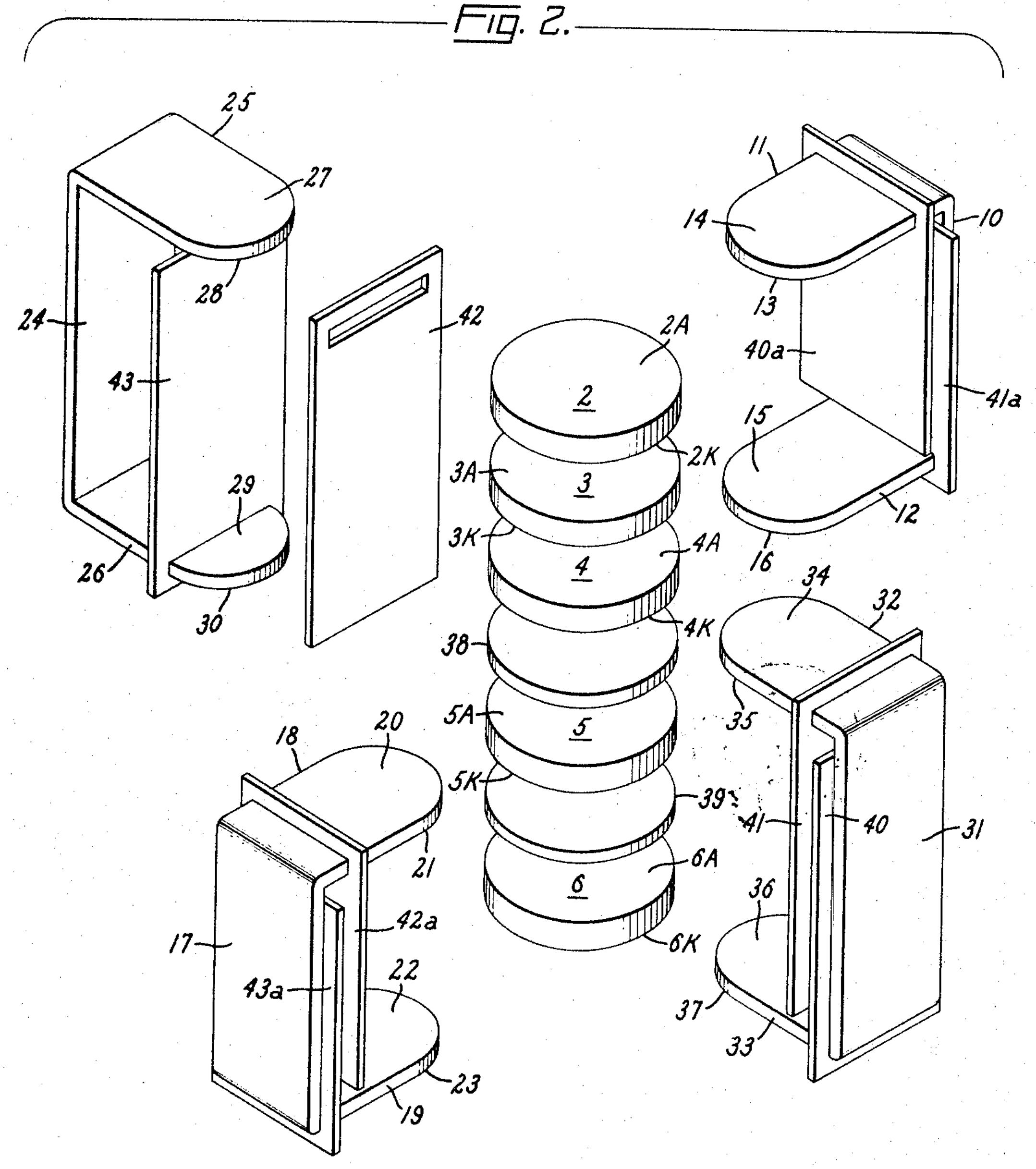
FIG. 2 is an exploded view of a portion of that shown in FIG. 1.

As can be seen from FIGS. 1 and 2 the "U-shaped" conductor 10 includes a pair of legs 11 and 12. Each leg in turn includes a pair of flat portions. For example, leg 11 includes flat portions 13 and 14 and leg 12 includes flat portions 15 and 16. The flat portion 13 of leg 11 abuts the anode 2A of rectifying element 2 and the flat portion 15 of leg 12 abuts the cathode 4K of rectifying element 4. Accordingly, the conductor 10 serves as one A-C terminal of the bridge circuit by electrically connecting the anode of element 2 to the cathode of element 4.

A second "U-shaped" conductor 17 forms the other A-C terminal of the bridge by interconnecting the anode of element 5 to the cathode of element 6. To that end conductor 17 includes a pair of legs 18 and 19, the leg 18 in turn includes flat portions 20 and 21 and the leg 19 includes flat portions 22 and 23. The flat portion of leg 18 abuts the anode 5A of element 5 and the flat portion of leg 19 abuts the cathode 6K of element 6.

A third "U-shaped" conductor 24 includes a pair of legs 25 and 26. Each leg in turn includes a pair of flat portions. For example, leg 25 includes flat portions 27 and 28, and leg 26 includes flat portions 29 and 30. The flat portion 27 of leg 25 abuts the cathode 2K of element 2 and the flat portion 29 of leg 26 abuts the cathode 5K of element 5. Accordingly, the conductor 24 serves as one D-C terminal of the bridge circuit by electrically connecting the cathodes of elements 2 and 5 together.

A fourth "U-shaped" conductor 31 forms the other D-C terminal of the bridge by interconnecting the anodes of elements 4 and 6 together. To that end conductor 31 includes a pair of legs 32 and 33. The leg 32 in turn includes flat portions 34 and 35 and the leg 33 includes flat portions 36 and 37. The flat portion 35 of leg 32 abuts the anode 4A of element 4 and the flat portion 37 of leg 33 abuts the anode 6A of element 6.

The heretofore described interconnection of the four rectifying elements 2, 4, 5 and 6 forms an A-C to D-C bridge circuit. A fifth rectifying element, 3, for reasons to be noted hereinafter, is connected across the bridge's D-C terminals 24 and 31 and is poled in the same direction as the polarity of those terminals. To accomplish this connection the flat portion 28 of the member 24 abuts the anode of element 3, and the flat portion 34 of the member 31 abuts its cathode.

In order to prevent short circuits between adjacent A-C terminals of the bridge I provide a flat wafer 38 of insulating material; e.g., mica, disposed between the flat portion 16 of conductor 10 and the flat portion 20 of conductor 17.

In order to prevent short circuits between the adjacent D-C terminals of the bridge I provide a second mica wafer, 39, between flat portion 30 of conductor 24 and the flat portion 36 of conductor 31.

Electrical insulation is also provided to prevent a short circuit between the A-C and the D-C terminals and/or the rectifying elements. Such insulation can be clearly seen in FIGS. 1 and 2 and comprises four sheets of insulating material, e.g., woven fiber glass, 40, 41, 42 and 43, each having an aperture therethrough. The sheets are adapted for being supported, via their apertures, on the legs of the interconnecting conductors so as to insulate adacent bridge components from one another. For example, insulating sheet 40 is supported on leg 32 of conductor 31 by its aperture. When supported in this manner sheet 40 serves to insulate the conductor 31 from adjacent portions of conductors 10, 17 and 24. In a similar manner sheet 41 is supported on leg 33, sheet 42 is supported on leg 25 and sheet 43 is supported on leg 26.

Figure 3:
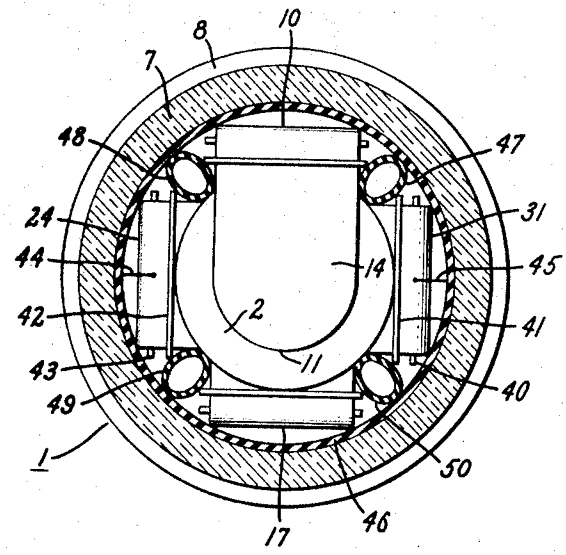
FIG. 3 is a top view of the bridge circuit shown in FIG. 1.

As can be seen in FIGS. 1 and 3 an electrical conductor 44 is provided within the tubular housing and serves to electrically connect the "U-shaped" conductor 24 to one of the ring-like members 8. In a similar manner a second electrical conductor or wire 45 connects conductor 31 to the other ring-like member 9. Accordingly, the ring-like members serve as the external D-C terminals of the integrally housed bridge device 1.

In order to prevent a short circuit between either or both of the ring-like members 8 and 9 and the adjacent parts of the bridge which are of different electrical potentials I provide a tubular member 46 of insulating material, e.g., woven fiber glass, between the tubular housing and the bridge components.

The stacked rectifying elements, the interposed and abutting "U-shaped" conductors and the insulation wafers form a bridge combination which is centered inside the tubular housing and spaced from the wall thereof. In this regard see the top sectional view of the device shown in FIG. 3. Such centering is accomplished through the use of plural insulating spacers 47, 48, 49 and 50. Each of the spacers is tubular in shape and is disposed between the bridge combination and the tubular insulator 46 with its axis parallel to the axis of the housing. Preferably each of the spacers is formed of an insulating material, e.g., Teflon.

As can be seen in FIG. 1 the bridge combination is disposed between a pair of capping members 51 and 52. These members serve to hermetically seal the device and to form its external A-C terminals. To that end such members are formed of an electrically conductive material. As can be seen capping member 51 abuts the flat portion 14 of conductor 10 and capping member 52 abuts the flat portion 23 of conductor 17.

In order to insure that the electrical connections between the internal abutting conductive components of the device is effectuated as well as to allow for its connection to an external electrical circuit and to effectuate heat dissipation therefrom, the device is mounted in a pressure assembly. Although various pressure assemblies may be utilized, I prefer to use an assembly similar to that shown in U.S. Pat. application Ser. No. 8,887 — Livezey et al. filed on Feb. 5, 1970 (now U.S. Pat. No. 3,651,383 and assigned to my assignee.

The particular assembly which I use is shown in FIG. 1. As can be seen therein rectifier 1 has its bridge components compressed between the flat surface areas of the capping members 51 and 52. The rims of the capping members are bonded to opposing ends of the tubular housing 7. In this manner there is formed a hermetically sealed, one-piece housing for the bridge circuit. The bridge combination is pressure mounted between the opposing ends of a pair of force transmitting electroconductive thrust members or posts 53 and 54 that will serve as electrical as well as thermal conductors. To that end they are formed of electrically as well as thermally conductive material. The opposing ends of the posts are tapered to fit inside the capping members 51 and 52. Furthermore, the surfaces of each post generally conform to and parallel the adjoining surfaces of the rectifying elements. In this manner each of the abutting conductive components of the device 1 is electrically and thermally conductively coupled to one of the posts 53 and 54 over a relatively broad area, and thus the device 1 is connected electrically in series with these posts.

Both of the posts include a flat portion of enlarged diameter which engages a flat tang which extends in a radial direction outwardly from the axis of the post. For example, tang 55 is in contact with post 53 and tang 56 is in contact with post 54. Both of said tangs extend in a radial direction from the axis of the post. The tangs serve as a means with which the assembly may be electrically connected into an external electric circuit.

Pressure is applied to the tangs, the posts, and the interposd bridge device 1 via a pair of bolts 57 and 58, a backup bar 59 and a leafspring 60. To that end, the backup bar abuts tang 56 and includes a pair of holes 61 and 62 in which the threaded end portions of bolts 57 and 58, respectively, are disposed. The leafspring includes a pair of holes through which the headed ends of bolts 57 and 58 pass. Upon the tightening of the bolts, the leaf-spring applies a clamping force to the interposed device.

To provide electrical insulation an insulating cap 59 is provided. The cap includes tubular legs 60 which are hollow to allow passage of the bolts therethrough. A surface 61 of the cap forms a seat for a solid cylindrical pivot 62. The pivot has two opposing surfaces 63 and 64. Surface 63 is flat and is fitted with extending walls in contact with the insulating cap surface 61. Surface 64 is generally flat but has a centrally located protruberance in a conical shaped truncated form. The truncated cone 65 is received within a central opening 66 of the spring member 60. When arranged in this manner the force applied to the interposed device upon the tightening of the tiebolts will be centered along its axis.

In the heretofore noted copending application of Kotheimer there is disclosed and claimed a fail-safe ground conductor continuity monitoring circuit for use with electrical equipment which is supplied with electric power from a remote location via a cable including a ground conductor. The monitoring circuit includes a transmitter at the site of the equipment for inserting a low-level monitoring current into the ground conductor and a receiver connected in the ground conductor at a remote location. The receiver includes a current sensitive relay whose coil monitors the current level in the ground conductor. The relay causes the deenergization of the electrical equipment if the current level in the ground conductor is sensed as being below a preselected level (which would be indicative of a ground conductor discontinuity). The receiver also comprises a five-diode bridge circuit having a pair of A-C terminals, by which the receiver is connected in the ground conductor, and a pair of D-C terminals which are electrically clamped by a forward poled diode and connected across the current monitoring relay's coil. The latter diode is provided to protect the relay from high levels of current which will flow through the ground conductor if there is a phase-to-ground short circuit in the equipment. The remaining diodes of the five-diode bridge circuit are operative for insuring that any current flowing through the relay coil flows in one direction irrespective of the direction of current flow through the ground conductor. In so doing adverse effects of stray conductor currents are minimized.

Owing to the fact the receiver is connected in series in the ground conductor it is of utmost importance that the receiver's five-diode bridge circuit be capable of handling high currents (such as would exist under fault conditions) without failing, or if it does fail to fail in a shorted condition, thereby maintaining the integrity of the grounding system.

The integrally housed 5-rectifier bridge circuit shown in FIGS. 1–3 herein is particularly adapted for use in Kotheimer's ground continuity monitoring system as the bridge and clamping diode combination of his receiver. To that end rectifying elements 2, 4, 5 and 6 are high current diodes (e.g., capable of handling 7,500 amperes for a few cycles without failing or if failure occurs to fail shorted) having a forward voltage drop of at least 0.3 volts at one ampere D-C and rectifying element 3 is a high current diode (e.g., capable of handling similar current levels) but having a forward voltage drop of at least 0.5 volts at one ampere D-C.

It should be apparent to those skilled in the art that if an unclamped rectifying bridge is desired, the rectifying element 3 can be replaced by an insulation wafer similar to wafer 38, 39.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. An integrally housed electric bridge assembly having a pair of A-C terminals and a pair of D-C terminals comprising:

a. a tubular insulative housing which is sealed at each end by a conductive capping member and which includes a pair of conductive members passing through the wall thereof;

b. at least four rectifying elements, each of said elements comprising a PN semiconductor wafer having a pair of flat sides, one of said sides being an anode and the opposite side being a cathode, said elements being disposed parallel to one another inside said housing and along its axis;

c. a plurality of electrical conductors disposed within said housing for interconnecting said elements and members, each of said conductors including flat portions which are interposed between and which abut selected rectifying elements, a first one of said interconnecting conductors having one portion abutting one of said capping members and a second one of said conductors having one portion abutting the other of said capping members, said rectifying elements and said abutting conductors being so arranged that upon the application of pressure to said capping members a bridge circuit results, one of said pairs of terminals comprising the capping members and the other of said pairs of terminals comprising the pair of conductive members; and d. insulating means comprising a flat wafer of insulating material disposed between the flat portions of said first and second conductors for ensuring electrical isolation therebetween.

2. The integrally housed electric bridge assembly as specified in claim 1 wherein said A-C terminals comprise said capping members and said D-C terminals comprise said pair of conductive members.

3. The integrally housed electric bridge assembly as specified in claim 2 wherein one of said rectifying elements is electrically connected between the D-C terminals and is poled in agreement with the polarity across said D-C terminals.

4. The integrally housed electric bridge assembly as specified in claim 3 wherein said plural conductors are each U-shaped with the sides thereof forming said flat portions.

5. The integrally housed electric bridge assembly as specified in claim 4 wherein there are five rectifying elements and wherein said one portion of said first interconnecting conductor abuts the anode of a first element and a first flat portion of said first conductor abuts the cathode of a second element, said one portion of said second conductor abuts the cathode of a third element and a second flat portion of said second conductor abuts the anode of a fourth element, a third electrical conductor is connected to one of said pair of conductive members and includes a third flat portion abutting both the cathode of said first element and the anode of a fifth element and a fourth flat portion abutting the cathode of said fourth element, and a fourth electrical conductor is connected to the other of said pair of conductive members and includes a fifth flat portion abutting both the anode of said second element and the cathode of said fifth element and a sixth flat portion abutting the anode of said third element.

6. The integrally housed electric bridge assembly as specified in claim 5 wherein said wafer of insulating material is located between said first and second flat portions and wherein electrical insulation means comprising another wafer of insulating material is disposed between said fourth and sixth flat portions.

7. The integrally housed electric bridge assembly as specified in claim 6 wherein electrical insulation is provided to isolate the third conductor from the first and second conductors and wherein electrical insulation is provided to isolate the fourth conductor from the first and second conductors.

* * * * *